(12) United States Patent
Carlson (10) Patent No.: US 6,722,480 B2
(45) Date of Patent: Apr. 20, 2004

(54) MAGNETICALLY ACTUATED MOTION CONTROL DEVICE

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/140,341

(22) Filed: May 7, 2002

(65) Prior Publication Data

US 2003/0209394 A1 Nov. 13, 2003

(51) Int. Cl.[7] .................................................. F16F 9/53
(52) U.S. Cl. .................................................. 188/267.2
(58) Field of Search .............................. 188/267, 267.1, 188/267.2

(56) References Cited

U.S. PATENT DOCUMENTS

| | | |
|---|---|---|
| 1,907,531 A | 5/1933 | Fitzgerald et al. |
| 2,938,606 A | 5/1960 | Passman |
| 3,483,951 A | 12/1969 | Bonesho et al. |
| 3,807,678 A | 4/1974 | Karnopp et al. |
| 3,866,720 A | 2/1975 | Wallerstein, Jr. |
| 4,491,207 A | 1/1985 | Boonchanta et al. |
| 4,638,896 A | 1/1987 | Poyser |
| 4,727,974 A | 3/1988 | Takatoshi |
| 4,827,162 A | 5/1989 | Morris et al. |
| 4,836,342 A | 6/1989 | Wolfe |
| 4,907,680 A | 3/1990 | Wolfe et al. |
| 4,921,272 A | 5/1990 | Ivers |
| 5,004,079 A | 4/1991 | Ivers et al. |
| 5,018,606 A | 5/1991 | Carlson |
| 5,046,594 A | 9/1991 | Kakinuma |
| 5,206,555 A | 4/1993 | Morris et al. |
| 5,207,774 A | 5/1993 | Wolfe et al. |
| 5,277,281 A | 1/1994 | Carlson et al. |
| 5,284,330 A | 2/1994 | Carlson et al. |
| 5,440,183 A | 8/1995 | Denne |
| 5,522,481 A | 6/1996 | Watanabe |
| 5,560,464 A | 10/1996 | Gonda et al. |
| 5,576,500 A | 11/1996 | Cage et al. |
| 5,588,509 A | 12/1996 | Weitzenhof et al. |
| 5,590,745 A | 1/1997 | Rensel et al. |
| 5,996,973 A | 12/1999 | Campbell |
| 6,053,291 A | 4/2000 | Shibahata et al. |
| 6,296,088 B1 | 10/2001 | Carlson .................. 188/267.2 |
| 6,336,535 B1 * | 1/2002 | Lisenker ................. 188/267.2 |
| 6,378,671 B1 | 4/2002 | Carlson .................. 188/267.2 |
| 6,547,044 B2 * | 4/2003 | Lisenker et al. ......... 188/267.2 |

* cited by examiner

Primary Examiner—Matthew C. Graham
(74) Attorney, Agent, or Firm—Michael M. Gnibus; Edward F. Murphy, III

(57) ABSTRACT

A magnetically actuated motion control device includes a housing defining a cavity and including a slot therethrough. A movable member is located within the cavity and is movable relative to the housing. A magnetic field generator located on either the housing or the movable member causes the housing to press against the movable member to develop a friction force. The flux caused by the magnetic field flows through the housing, the movable member and at least one pole located along the movable member. The at least one pole comprises a first portion having a first axial dimension and a second portion having a second axial dimension where the first axial dimension is greater than the second axial dimension and as a result the magnetic flux through the second portion of the at least one pole has a greater magnitude than the magnetic flux through the first portion of the pole.

18 Claims, 5 Drawing Sheets

MAGNETICALLY ACTUATED MOTION CONTROL DEVICE

FIELD OF THE INVENTION

The present invention relates to a magnetically actuated motion control device. In particular the present invention relates to magnetically actuated motion control devices that vary the contact force between a first member and a second member in accordance with a generated magnetic field.

BACKGROUND OF THE INVENTION

Magnetically actuated motion control devices such as magnetically controlled dampers or struts provide motion control, e.g., damping that is controlled by the magnitude of an applied magnetic field. Much of the work in the area of magnetically controlled dampers has focused on either electrorheological (ER) or magnetorheological (MR) dampers. The principle underlying both of these types of damping devices is that particular fluids change viscosity in proportion to an applied electric or magnetic field. Thus, the damping force achievable with the fluid can be controlled by controlling the applied field. Examples of ER and MR dampers are discussed in U.S. Pat. Nos. 5,018,606 and 5,284,330, respectively, assigned to Lord Corporation of Cary, N.C.

Generally, MR fluids have high yield strengths and viscosities, and therefore are capable of generating greater damping forces than ER fluids. In addition, the viscosities of MR fluids are precisely controlled by easily produced magnetic fields that are generated by energizing simple low voltage electromagnetic coils. As a result, dampers employing MR fluids have become preferred over ER dampers.

Because ER and MR fluid dampers involve fluid damping, the dampers must be manufactured with precise valving and seals. In particular, such dampers typically require a dynamic seal and a compliant containment member and as a result, prior art MR and ER dampers are not easy to manufacture or assemble. Further, the ER and MR fluid dampers can have significant "off-state" forces when the devices are operated at high speeds and the off-state forces can further complicate their manufacture and assembly. Off-state forces refer to those forces at work in the damper when the damper is not energized.

As a result of the shortcomings associated with prior art MR and ER fluid devices, magnetically actuated alternatives to traditional MR fluid motion control devices have been developed. Such magnetically actuated prior art devices are disclosed in pending U.S. Pat. No. 6,378,671 for "Magnetically Actuated Motion Control Device" and in pending divisional application of the allowed '365 application having Ser. No. 10/080,293, filed Feb. 20, 2002 for a "System Comprising Magnetically actuated Motion Control Device". Both of the issued patent and pending application are assigned to Lord Corporation of Cary, N.C. The prior art magnetically actuated devices disclosed in the applications contain no MR or ER fluid, yet provide a variable level of coulombic or friction damping that is controlled by the magnitude of the applied magnetic or electric field. Prior art magnetically actuated motion control devices overcome a number of the shortcomings associated with MR and ER fluid devices. For example, prior art magnetically actuated motion control devices: may be manufactured and assembled relatively simply and at a relatively low cost; allow for very loose mechanical tolerances and fit between components; do not require a dynamic seal or a compliant containment member; have particularly low off-state forces and provide for a wide dynamic range between the off-state and a maximum damping force. The wide dynamic range is particularly evident when the devices are operated at high speeds.

Figure 1:
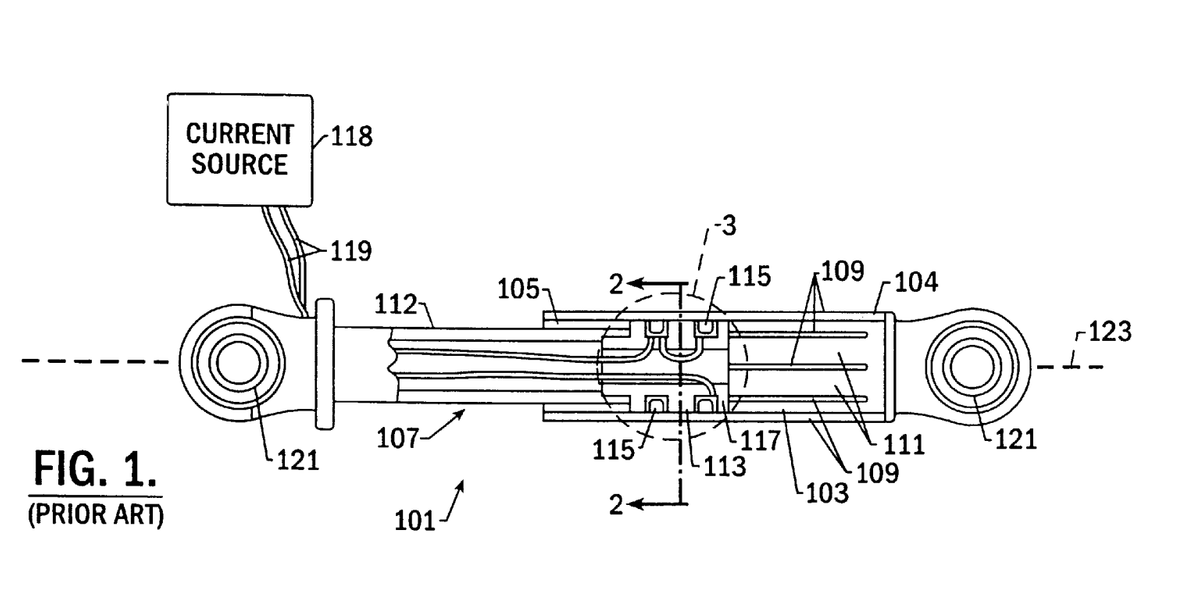
FIG. 1 is a cutaway longitudinal sectional view of a prior art magnetically actuated motion control device.
Figure 2:
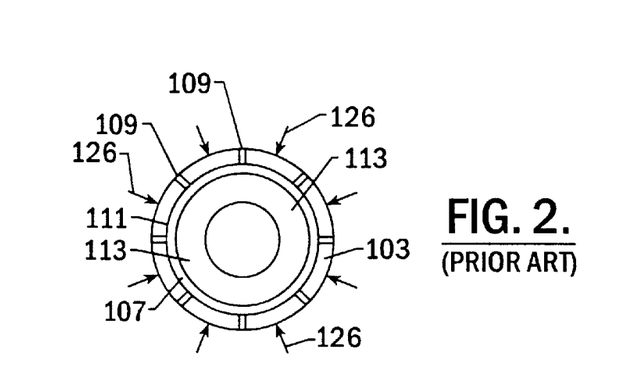
FIG. 2 is a lateral sectional view taken along section line 2—2 in FIG. 1.
Figure 3:
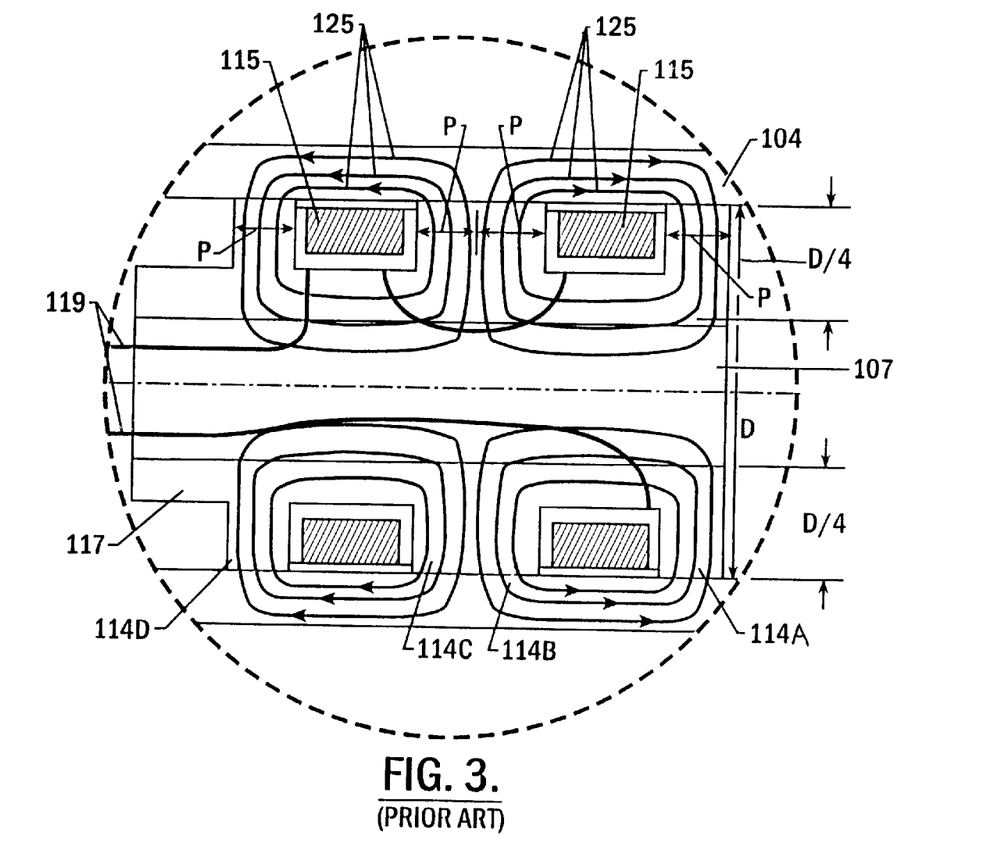
FIG. 3 is an enlarged, partial view of the portion of the device enclosed by the circle identified as 3 in FIG. 1.

An exemplary prior art magnetically actuated motion control device disclosed in the pending applications referred to in paragraph [0005] hereinabove is illustrated generally in FIGS. 1, 2 and 3. The prior art motion control device or damper is identified generally at 101 in FIG. 1 and includes a tubular housing 103 defining a cavity 105 in which a piston 107 is located and moveable linearly therein along axis 123. Each end of the damper preferably includes a conventional, well known structure which facilitates attaching damper 101 to other structures, such as clevis eye 121 for attaching the end to a portion of a damped component. The housing 103 includes a least one axially aligned slot 109. The slot may also be referred to as a longitudinally extending slot. The prior art device 101 of FIG. 1 comprises eight slots. All eight of the slots are illustrated in FIG. 2 and five of the slots are illustrated in FIG. 1. The slots pass through the housing wall to define flexible bands, tabs, or fingers 111. The slots 109 extend through the wall of the housing 103 and extend axially nearly the entire length of the housing.

Piston 107 includes a shaft 112 having a magnetically active portion 113 made up of at least one, and preferably two electromagnetic coils 115 set in a magnetically permeable core 117. The portion 113 may also be referred to as a piston head hereinafter. Although here the magnetically permeable core 117 is hollow, the core can alternatively be a solid bobbin. A hollow core allows space for locating connecting wires 119 therein. As shown in FIG. 3, the piston head 113 also defines a plurality of annular poles 114A, 114B, 114C and 114D located adjacent the axially directed portions of the coils 115. The poles 114A–114D have substantially the same dimensions. The poles comprise substantially the same overall axial dimension identified as P in FIG. 3 and a constant lateral dimension equal to approximately one quarter of the diameter D and such lateral dimension is identified as D/4 in FIG. 3. The axial pole dimension P remains substantially constant as the pole extends laterally along the dimension D/4. The poles have substantially rectangular cross sections and hold a constant radial clearance 127 between the outer periphery of the poles and the housing wall when the coils are not energized. In the prior art device 101, the magnetic flux produced when the electromagnets are energized is substantially constant through the poles 114A–D, the inner portion of piston head 113 and housing wall 104, and the constant flux is illustrated by the equally spaced flux lines 125 in FIG. 3. The constant flux is primarily a result of the substantially constant dimensions of the poles, active portion 113 and wall 104.

A current source 118 supplies current to the coils 115 through wires 119. Current flowing through the coils 115 creates a magnetic field that draws the housing 103 in toward the piston head 113. As indicated above, the created magnetic field is illustrated in FIG. 3 by field lines 125. Also shown in FIG. 3 the field surrounds the coil 115 and passes through the poles 114, inner portion of head 113 and housing wall 104. Like head 113, the housing 103 is also made from a magnetically permeable material that will be attracted by the magnetic field including, but not limited to, steels and other iron alloys. The amount of current flowing through the coils 115 is generally directly proportional to the magnitude of the magnetic field generated. Thus, control of the electric current flowing through the coils 115 can be used to control the normal or pressing force between the inner surface of the housing 103 and the outer surface of the piston 107, thereby controlling the damping effect of the damper 101.

The slotted housing 103 and the head 113 of the piston 107 are preferably made from low carbon, high permeability steel, although other magnetically permeable materials can be used. The slots 109 are preferably evenly spaced around the circumference of the housing 103 so that axial-periodic symmetry is maintained. The pair of coils 115 is preferably wired such that they produce magnetic fields in opposite directions as indicated by the directional arrows associated with the field lines 125 illustrated in FIG. 3. This configuration allows the magnetic field produced by each coil 115 to add rather than cancel in an area between the adjacent coils 115.

An illustration of the damping effect produced by device 101 can be seen in the lateral sectional view shown in FIG. 2, which shows the relationship of the slotted housing 103 with respect to the piston 107. When no magnetic field is applied, the piston 107, and particularly the head 113, fits loosely within the housing 103 to define a small radial clearance 127 between the housing 103 and the magnetically active portion 113 of the piston 107. That is, the housing 103 is relaxed and does not press against the piston head 113. When current is supplied to the coils 115 the magnetic field generated causes the flexible fingers 111 in the housing 103 to be attracted radially inward as indicated by the arrows 126 such that the housing 103 squeezes the piston 107 with a force proportional to the applied magnetic field, and therefore the applied current.

Although prior art damping devices are an effective source of damping in many applications, there are shortcomings associated with the prior art magnetically actuated device 101. The hollow configuration of the active portion 113 of piston 107 and the properties of the magnetically permeable materials comprising the poles 114 and head 113, cause the devices to become magnetically saturated. As a result of such saturation, prior art devices are limited in the magnitude and range of damping forces that may be provided. Prior art magnetically actuated devices do not maximize the magnetic flux at the area of contact between the housing and piston. Rather prior art devices provide for substantially the same magnitude magnetic flux at and away from the area of contact between the housing and piston head when the magnetic field is generated.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE DISCLOSURE

According to one aspect of the invention, a magnetically actuated motion control device is provided. The magnetically actuated motion control device includes a a first member defining a cavity; a second member positionable within the cavity and being movable relative to the first member along an axis when positioned therein, the second member comprising at least one pole, the at least one pole having a first portion comprising a first axial dimension and a second portion having a second axial dimension, the first axial dimension being greater than the second axial dimension; at least one of the first member and the second member including at least one moveable finger; a magnetic field generator located on another of the first member and the second member, the magnetic field generator causing one of a portion of the first member and a portion of the second member to press against the other of the portion of the first member and the portion of the second member.

By decreasing the axial dimensions between an inner first pole portion and an outer second pole portion the magnetic flux, $\phi$, per unit area, also referred to as flux density, $\beta$, is increased at the outer contact surface comprising the second pole portion. In this way the poles serve to channel or funnel the magnetic flux between the inner and outer portions of the poles. The flux density may be represented by the following equation: $\beta=\phi/\text{Area}$. The magnetically actuated devices of the present invention provide a greater range of dynamic damping forces than conventional piston devices.

The poles may comprise any suitable cross section including but not limited to a wedge-shaped cross section or a cross section that has a substantially rectangular portion with a contact portion extending outwardly from the substantially rectangular portion. The movable member may comprise any suitable number of piston heads. Each piston head may comprise any number of poles and the poles may be substantially the same or different.

The foregoing and other aspects will become apparent from the following detailed description of the invention when considered in conjunction with the accompanying drawing figures.

BRIEF DESCRIPTION OF THE DRAWINGS

The objects and advantages of the invention will be understood by reading the following detailed description in conjunction with the following drawing Figures.

DETAILED DESCRIPTION OF THE EXEMPLARY EMBODIMENTS OF THE INVENTION

For a better understanding of the invention, the following detailed description refers to the accompanying drawings, wherein exemplary embodiments of the present invention are illustrated and described.

Generally, the present invention magnetically actuated device overcomes the limitations exhibited by prior art ER and MR and magnetically actuated devices by providing for maximum magnetic flux at the piston head contact surface that is pressed against by the housing when a magnetic field is produced by the coil. Unless otherwise indicated as the description proceeds, the disclosed preferred embodiments of the present invention magnetically actuated device include the housing 103, piston shaft 112, longitudinal slots 109, fingers 111 coils 115, current source and wires 118 and 119 and attachment means 121 as previously described hereinabove in the description of prior art device 101.

A number of alternate embodiment piston head members for use in present embodiment damper 10 are disclosed in FIGS. 4–8.

Figure 4:
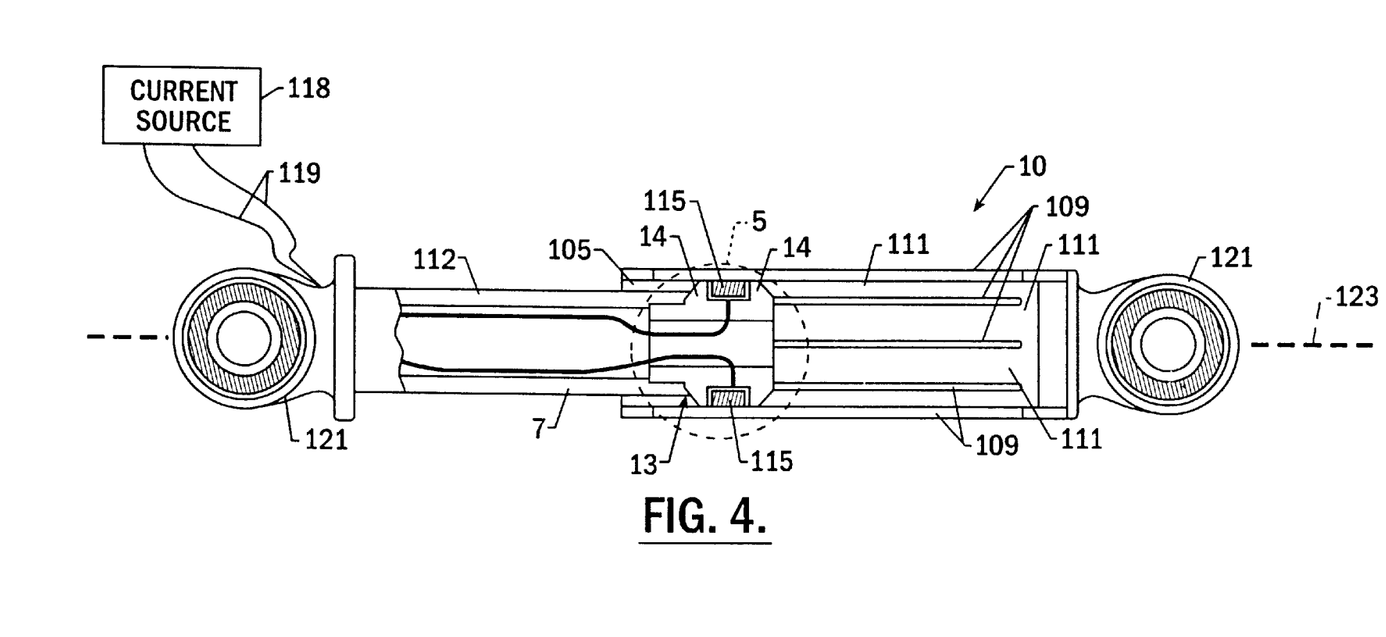
FIG. 4 is a cutaway longitudinal sectional view of the magnetically actuated motion control device of the present invention comprising a first embodiment piston head.
Figure 5:
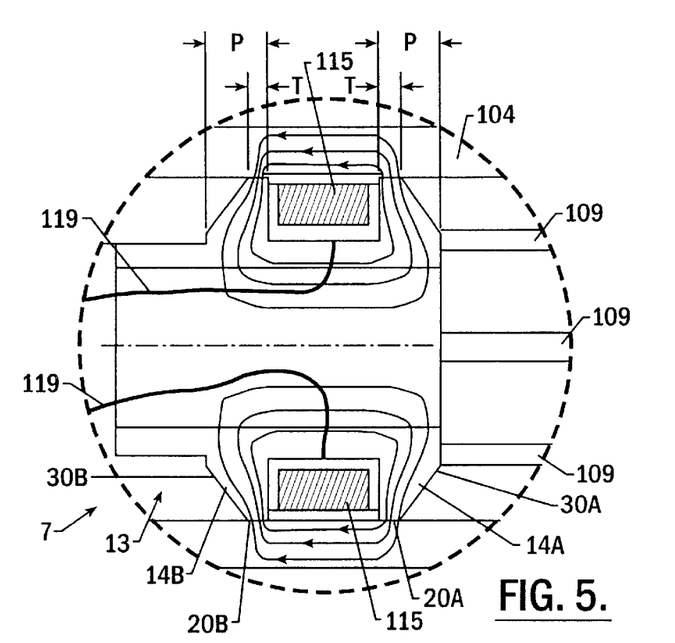
FIG. 5 is an enlarged, partial view of the portion of the device enclosed by the circle identified as 5 in FIG. 4.

Now turning to FIGS. 4 and 5 that illustrate the magnetically actuated device of the present invention 10, the device 10 generally comprises tubular housing 103 that defines cavity 105 and a piston member 7 comprising shaft 112 and first embodiment piston head 13 movable through the cavity along longitudinal axis 123. An electromagnetic coil is supported by the piston head. The present invention device 10 includes an improved piston head 13 that maximizes the magnetic flux density, β, through the portions of annular poles 14A and 14B that define annular contact surfaces 20A and 20B. The contact surfaces are pressed against by the flexible housing fingers 111 when a magnetic field is generated. The contact surfaces are located along the outer peripheries of the poles 14A and 14B. The piston head 13 includes a single coil 115 and although two poles are shown, the piston head may include any suitable number of poles. For purposes of describing the first preferred embodiment of the piston head 13, the pole members 14A and 14B are adjacent each axially directed side of coil 115.

As shown in detail in FIG. 5, each pole extends annularly along the piston head and has a first axially directed dimension identified as P, and this dimension represents the overall axial dimension of the respective pole. Each pole also comprises a second dimension identified as T in FIG. 5 and this second dimension represents the axial dimension of the annular contact surface 20A, 20B defined by the respective pole. For each pole 14 the first axial dimension P is greater than the second axial dimension T. The inventor has determined that it is not critical to the invention to maintain a precise ratio of the magnitudes of the first and second axial dimensions however it is believed that in practice for most intended applications of the present invention the ratios of such axial dimensions P:T may fall in the ratio range, including the end points, between 1.5:1–2.5:1. Although the values of P and T are illustrated as being equal for the poles 14A and 14B, the values of P and T may be different to achieve different damping effects.

Each pole 14A and 14B includes a respective face 30A, 30B that is tapered inwardly as the face extends outwardly from axis 123 toward surface 20. For each pair of poles, the faces 30A, 30B are generally convergent. The face 30 joins the contact surface 20 and inner portion of the piston head 13. In cross section, as shown in FIG. 5, the poles are generally wedge-shaped, and the wedge shape serves to promote an increase in the magnitude of the magnetic flux at the contact surface 20 by directing the magnetic flux through the pole 14 from a wide "inlet" with dimension P to a narrower pole discharge at the contact surface 20 with an axial dimension T that is smaller than the dimension P. The pole produces a funneling effect where the density or flux of the magnetic field through the contact surface area is greater than the density of the flux entering the pole. As a result, of the variable lateral pole dimension the magnitude of the magnetic flux through the contact surface is significantly increased over prior art magnetically actuated devices that provide for substantially constant magnitude magnetic flux through the poles.

Figure 6:
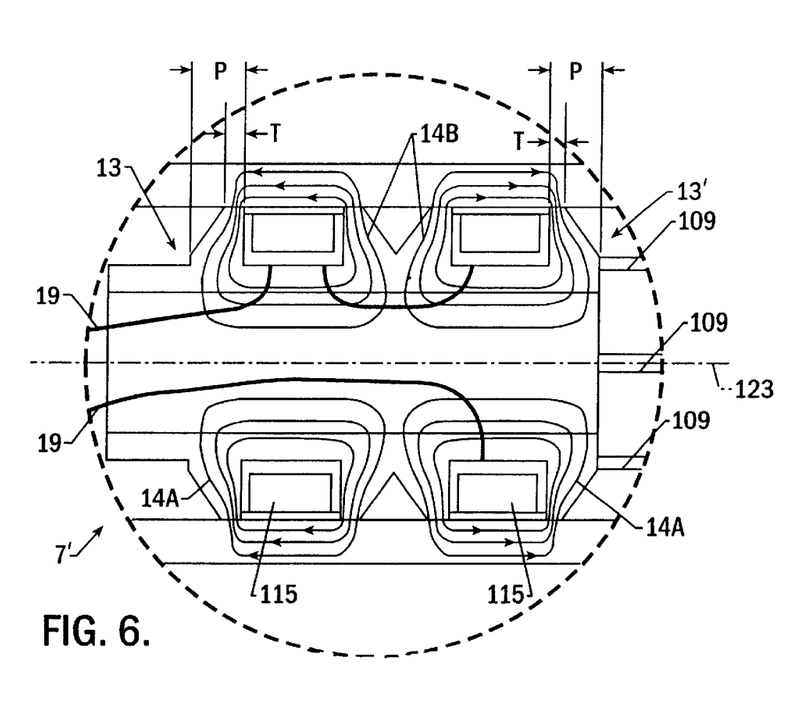
FIG. 6 is an enlarged, partial view of a second alternate embodiment piston head comprising two of the piston heads disclosed in FIG. 5.

Although the piston 7 illustrated in FIG. 5 comprises a single head 13 with coil 115 having poles 14 along the axially extending sides of the coil, it should be understood that in a second alternate embodiment the piston 7' may comprise a plurality of piston heads like piston head 13 previously described. FIG. 6 illustrates such an alternative embodiment piston comprising two like piston heads 13 and 13' integral at respective adjacent inner poles 14B between coils 115. The piston head 13' includes all of the elements and dimensional relationships as previously described in connection with piston head 13. Although two like piston heads are illustrated in the piston of FIG. 6 it should be understood that it is contemplated that any suitable number of piston heads may be made integral to produce the desired friction forces in a magnetically actuated device of the present invention. Also as shown in FIG. 6, the magnetic fields produced by the respective piston coils 115 flow in opposite directions causing the magnetic fields produced by each coil to add rather than cancel in the area where the pistons 13 and 13' are joined between the coils 115. Although the poles as illustrated and described are substantially the same it should be understood that the relative geometries of the poles may be different. In summary, as a result of the increased flux per the area of the contact surface of the first and second embodiment piston heads, the damping forces produced by a magnetically actuated device that includes the first or second embodiment piston head 13" will be greater than those damping forces produced by prior art devices.

Figure 7:
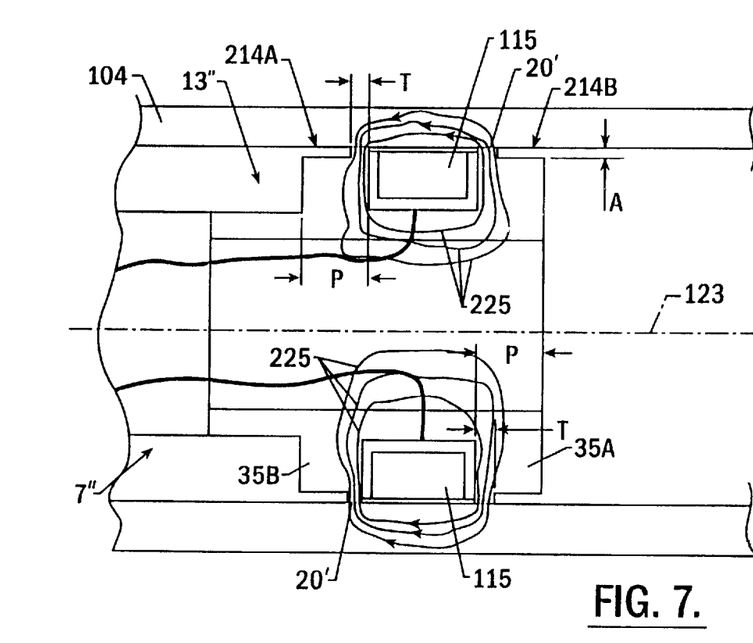
FIG. 7 is an enlarged partial view of a third alternate embodiment piston head for use in the magnetically actuated control device of the present invention.

A third alternate embodiment piston 7" is illustrated in FIG. 7. Like the piston members previously described, the third embodiment piston 7" is adapted to be displaced linearly along axis 123 in housing chamber 105 of magnetically actuated device 10 illustrated in FIG. 4. The piston 7" comprises hollow cylindrical piston head 13" comprises electromagnetic coil 115 as previously described with poles 214A and 214B located at the axially directed ends of the coil. The piston head may comprise any suitable number of poles. As shown in FIG. 7 the annular poles are substantially the same and comprise a first axial dimension P representing the overall axial dimension of the pole, a second axial dimension T representing the axial dimension of the contact surfaces 200A, 200B, and a lateral dimension A representing the difference in the radial dimensions between the contact surface and the remaining portion of the pole located away from coil 115. The first axial dimension P is greater than the second axial dimension T of the contact surface. The inventor has not determined a critical ratio or relationship between the first and second axial dimensions.

The poles have a main portion 35A, 35B that has a substantially rectangular cross section with the annular portion that defines the outer peripheral contact surface extending outwardly from the main portion 35A, 35B of the pole by the distance A. The magnitude of the dimension A must be relatively small in order for the pole to efficiently channel the magnetic flux 225 through the contact member surface 20'. The inventor has not determined a critical dimension for the radial offset distance A, however it is believed that a suitable effective magnitude for dimension A is one that is approximately equal to dimension T, as illustrated in FIG. 7.

Like the poles of the first and second alternate embodiment piston heads, the poles of third embodiment piston head 13" produce a flux funneling or channeling effect where the density or flux of the magnetic field through the contact surface is greater than the density of the flux entering the pole 35A and 35B. As a result, of the variable axial pole dimension and the step dimension A, the magnitude of the magnetic flux through the contact surface area is significantly increased over prior art magnetically actuated devices that provide for substantially constant magnitude magnetic flux through the poles as a result of their constant cross sectional dimensions and configurations. As a result of the increased flux per the area of the contact surface in the third embodiment piston head 13", the damping forces produced by a magnetically actuated device that includes third embodiment piston head 13" are greater than those damping forces produced by prior art devices.

Figure 8:
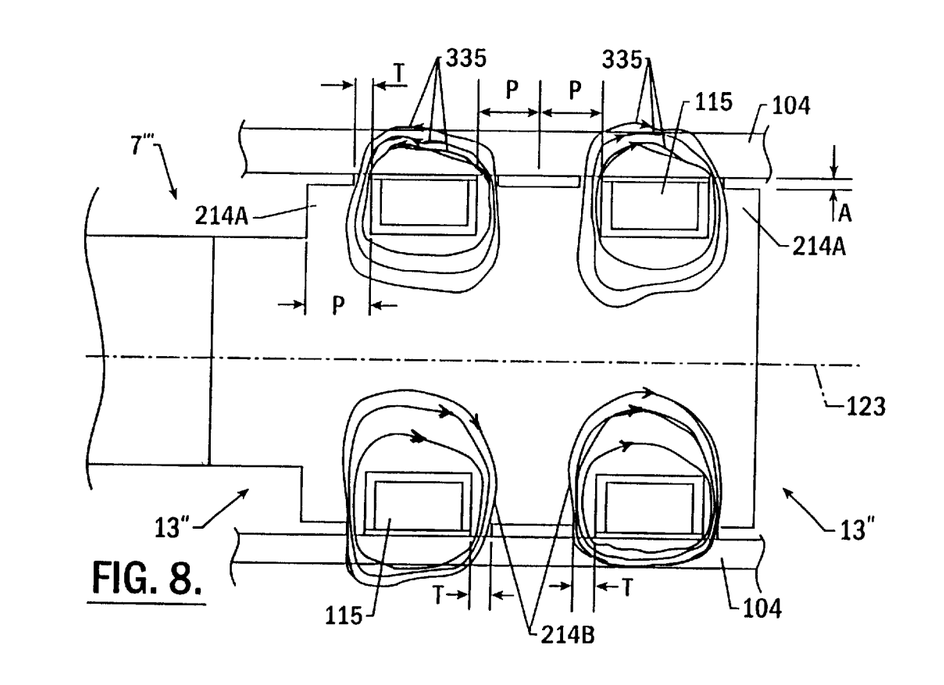
FIG. 8 is an enlarged partial view of a fourth alternate embodiment piston head comprising two of the piston heads disclosed in FIG. 7.

A fourth embodiment piston 7''' is illustrated in FIG. 8 and the piston 7''' comprises two like piston heads 13" and 13''' like those described in connection with third alternate embodiment piston 7". Piston head 13''' comprises all of the elements and dimensional relationships described in connection with piston head 13" hereinabove. As illustrated in FIG. 8, the piston heads are made integral at the poles 214B located between the coils 115. The piston head includes a total of four poles with the poles of each head identified as 214A and 214B. By increasing the number of piston heads comprising piston 7''', a greater range of damping forces may be supplied by magnetically actuated damping device 10 of the present invention. Although two piston heads 13" are illustrated in piston 7''' of FIG. 8, it should be understood that any suitable number of piston heads may be made integral to comprise fourth embodiment piston 7'''. The magnetic fields 335 are additive in the same manner as previously described in connection with second embodiment piston head 7'.

The damping force supplied by the damper of the present invention may be approximated by the following relationship:

$$\text{Equation 1}: \quad F = \frac{c(B_t^2)A_t}{\mu_0}$$

where c is the coefficient of friction, $B_t$ is the magnetic flux density at the friction interface, $A_t$ is the total area of the pole tips and $\mu_o$ is the magnetic constant. Intuitively it would appear based on the relationship of Equation 1 that by decreasing the pole tip area the overall supplied force, F would decrease. However, as represented mathematically below, the magnetic flux density $B_t$ is inversely dependent on $A_t$:

$$\text{Equation 2}: \quad B_t = \frac{NI}{A_t R}$$

In the mathematical relationship of Equation 2, N represents the number of turns in the magnetic coil; I represents the current through the coil; $A_t$ is the total pole tip area and R is the total magnetic reluctance. Thus decreasing $A_t$ has the effect of increasing $B_t$. Returning to Equation 1, because Force, F in equation 1 scales as $B_t^2$, the overall force, F increases with a decrease in area. Therefore, by combining equations 1 and 2 it can be shown that the force output of the damper of the present invention is approximately given by the following mathematical relationship:

$$\text{Equation 3}: \quad F = \frac{c(NI)^2}{\mu_0 A_t R^2}$$

where c is the coefficient of friction, N is the number of turns in the coil, I is the current $A_t$ is the total pole tip area, $\mu_o$ is the magnetic constant and R is the total magnetic reluctance. Thus, with constant reluctance R, the total force F will increase if the pole tip area $A_t$ is reduced. The number of turns in the coil and the current and hence the total electric power remain constant. In the present invention the pole tip area is minimized which thereby provides for increased damping forces relative to prior art damping devices comprising field responsive material.

The present invention has been described with reference to exemplary embodiments. However, it will be readily apparent to those skilled in the art that it is possible to embody the invention in specific forms other than as described above without departing from the spirit of the invention. The exemplary embodiments are illustrative and should not be considered restrictive in any way. The scope of the invention is given by the appended claims, rather than the preceding description, and all variations and equivalents which fall within the range of the claims are intended to be embraced therein.

What is claimed is:

1. A magnetically actuated motion control device, comprising:

a first member defining a cavity said first member including at least one moveable finger;

a second member positionable within the cavity and being movable relative to the first member along an axis when positioned therein, the second member comprising at least one pole and a magnetic field generator for generating a magnetic field, the at least one pole having a first magnetic field entering wide portion comprising a first axial dimension and a second contact surface area narrower portion having a second axial dimension, the first magnetic field entering wide portion first axial dimension being greater than the second contact surface area narrower portion second axial dimension to produce a magnetic field funneling effect wherein said magnetic field generator generates a magnetic field which enters the at least one pole through the first magnetic field entering wide portion with a pole entering magnetic field flux and exits the at least one pole through the second contact surface area narrower portion with a contact surface area magnetic field flux with the contact surface area magnetic field flux greater than the pole entering magnetic field flux and causing a portion of the first member movable finger to press against the second contact surface area portion at least one of the first member and the second member including at least one moveable finger.

2. The magnetically actuated motion control device of claim 1 wherein the at least one pole has a wedge-shaped cross section.

3. The magnetically actuated control device of claim 1 wherein the at least one pole includes a substantially rectangular portion with said second contact surface area narrower portion directed outwardly from the rectangular portion.

4. The magnetically actuated control device of claim 2 wherein the second member comprises two poles.

5. The magnetically actuated control device of claim 3 wherein the second member comprises three poles.

6. The magnetically actuated control device of claim 2 wherein the first axial dimension is approximately twice as long as the second axial dimension.

7. The magnetically actuated control device of claim 3 wherein the contact portion extends outwardly from the substantially rectangular portion by a first lateral dimension.

8. The magnetically actuated control device of claim 7 wherein the first lateral dimension is substantially equal to the second axial dimension.

9. The magnetically actuated control device of claim 1 wherein the second member comprises a piston member that further comprises a piston head.

10. The magnetically actuated control device of claim 1 wherein the second member comprises a piston member that further comprises a plurality of piston heads.

11. The magnetically actuated control device of claim 1 wherein the second member comprises a piston member that further comprises two piston head.

12. (original) the magnetically actuated control device of claim 2 wherein the pole has an face that tapers inwardly as the face extends outwardly from the axis.

13. The magnetically actuated control device of claim 1 wherein each of the at least one pole is annular.

14. A magnetically actuated motion control device, comprising:
- a first member defining a cavity said first member including at least one moveable finger;
- a second member positionable within the cavity and being movable relative to the first member along an axis when positioned therein, the second member comprising at least one pole, the at least one pole having a first magnetic field entering portion comprising a first axial dimension and a second contact surface area portion having a second axial dimension, the first magnetic field entering portion first axial dimension being greater than the second contact surface area portion second axial dimension;
- at least one of the first member and the second member including at least one moveable finger;
- a magnetic field generator located on the second member, wherein said magnetic field generator generates a magnetic field with a first magnetic flux per unit area across the first magnetic field entering portion and a second magnetic flux per unit area across the second contact surface area portion, said magnetic field causing said at least one moveable finger to press against said second contact surface area portion with said second magnetic flux per unit area greater than said first magnetic flux per unit area.

15. The magnetically actuated motion control device, as claimed in claim 14 wherein said magnetic field generator includes a rectangular cross section electromagnetic coil.

16. The magnetically actuated motion control device as claimed in claim 14 wherein the at least one pole is wedge-shaped.

17. The magnetically actuated motion control device as claimed in claim 14 wherein each pole comprises a cross section that further comprises a substantially rectangular portion with said second contact surface area portion extending outwardly from the substantially rectangular portion.

18. A magnetically actuated motion control device, comprising:
- a first member defining a cavity;
- a second member positionable within the cavity and being movable relative to the first member along an axis when positioned therein, the second member comprising at least one pole, the at least one pole having a first portion comprising a first axial dimension and a second portion having a second axial dimension, the first axial dimension being greater than the second axial dimension;
- at least one of the first member and the second member including at least one moveable finger;
- a magnetic field generator located on another of the first member and the second member for generating a magnetic flux per unit area in said at least one pole, the magnetic field generator causing one of a portion of the first member and a portion of the second member to press against the other of the portion of the first member and the portion of the second member, the magnetic flux per unit area increasing between the first and second pole portions.

\* \* \* \* \*